United States Patent
Lara Dominguez et al.

(10) Patent No.: US 11,638,946 B2
(45) Date of Patent: May 2, 2023

(54) CABLE BEND RADIUS GAUGE

(71) Applicant: INTERNATIONAL BUSINESS MACHINES CORPORATION, Armonk, NY (US)

(72) Inventors: Jonathan Oswaldo Lara Dominguez, Guadalajara (MX); Oscar Eduardo Flores Pantoja, Zapopan (MX); Victor Arturo Tapia Jimenez, Guadalajara (MX); Luis Cruz Mejia, Guadalajara (MX); Jesus Ernesto Ibarra Hernandez, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 17/101,065

(22) Filed: Nov. 23, 2020

(65) Prior Publication Data

US 2022/0161305 A1 May 26, 2022

(51) Int. Cl.
*B21D 7/02* (2006.01)
*G01B 3/34* (2006.01)

(52) U.S. Cl.
CPC ............ *B21D 7/02* (2013.01); *G01B 3/34* (2013.01)

(58) Field of Classification Search
CPC ........... B21D 7/02; B21D 7/021; B21D 7/14; G01B 3/30; G01B 3/34
See application file for complete search history.

(56) References Cited

U.S. PATENT DOCUMENTS

| | | | |
|---|---|---|---|
| 2,541,891 A * | 2/1951 | Schmoll | G01B 3/30 33/32.2 |
| 3,201,873 A * | 8/1965 | Bell | G01B 3/30 33/562 |
| 6,044,194 A | 3/2000 | Meyerhoefer | |
| 6,271,476 B1 | 8/2001 | Bobowick et al. | |
| 6,388,193 B2 | 5/2002 | Maynard | |
| 7,027,706 B2 | 4/2006 | Diaz et al. | |
| 9,724,747 B2 | 8/2017 | Anderson | |
| 10,534,150 B2 | 1/2020 | Gutierrez Flores | |
| 2006/0277968 A1 * | 12/2006 | Mirtz | B21D 7/021 72/459 |

FOREIGN PATENT DOCUMENTS

| | | |
|---|---|---|
| CN | 102035124 B | 2/2014 |
| CN | 106391920 B | 11/2018 |
| CN | 107737855 B | 10/2019 |
| WO | 02211811 A1 | 3/2002 |

OTHER PUBLICATIONS

Author Not Provided, "Cable Bending Radius Control Tool and Process", Publication Date, Aug. 19, 2005, IP.com No. IPCOM000127277D, https://priorart.ip.com/IPCOM/000127277 pp. 1-4.

* cited by examiner

*Primary Examiner* — Teresa M Ekiert
(74) *Attorney, Agent, or Firm* — Tihon Poltavets

(57) ABSTRACT

A tool for bending cable comprising a web forming a base having an upper surface, a lower surface, first edge, second edge, a first area of the base defining a bend member portion and a second area of the base defining a hand hold portion. The tool further comprising a set of wire gauge measuring intervals is integral with the first edge in the second area. The tool further comprising a set of bend members is arranged in a raised diminishing hierarchy on the upper surface in the first area, forming a cable bend radius gauge.

17 Claims, 8 Drawing Sheets

CABLE BEND RADIUS GAUGE

BACKGROUND

The present invention relates to cable management, and more specifically, to a device for bending cable being routed into, out of, or within a cable management system or a cable distribution system.

An understanding of importance of cable bend radius is required to prevent damage to a cable, and possibly to connectors and associated equipment while routing and connecting cables. Working with electrical cables require understanding how a bend radius of the cable can affect characteristics, of the cable, including cable integrity, fatigue, operational reliability and service life. Proper bending of a cable during installation of the cable is useful to avoid possible issues affecting performance.

There is a distinction between a bending radius and a minimum bending radius. The bend radius measured to the inside of the curvature of the wire can be described as a minimum radius a cable or wire can bend without damaging the cable or wire. A smaller bend radius for a cable or wire is an indication of greater flexibility of the material comprising the cable or wire. In general terms a minimum bend radius of a chosen cable determines how tightly the chosen cable can be bent without placing too much stress on the cable, leading to physical damage including cracks (on the outer diameter of the cable) or kinks (on the inner diameter of the cable). As a result, adherence to the minimum bend radius provides a safe operational range for an application of the cable, ensuring optimal performance. The minimum bend radius may be described as a threshold radius at up to and including the threshold value, the cable or wire could safely be bent. Surpassing this minimum bend radius for a particular cable or wire would cause physical and/or conductive damage to the particular cable or wire. One key factor in achieving long service life and operational reliability of a cable is the proper bend radius for the cable.

Industry users typically determine a required radius of a bend, which can be applied to a given cable without damaging the given cable, using one or more industry charts listing a minimum bending radius based on cable type and diameter. Cable types vary in structure including single or multiple conductor cables without a metallic shielding, single or multiple conductor cables with a metallic shielding, and multiple conductor cables with a multiple individual metallic shielded cables.

SUMMARY

According to an embodiment of the present invention, a tool for bending cable, comprises a web forming a base having an upper surface, a lower surface, first edge, second edge, a first area of the base defining a bend member portion and a second area of the base defining a hand hold portion. A set of wire gauge measuring intervals is integral with the first edge in the second area. A set of bend members is arranged in a raised diminishing hierarchy on the upper surface in the first area forming a cable bend radius gauge.

According to another embodiment of the present invention, a method for bending cable in response to receiving a selected cable, determines a type of cable used, including descriptive information associated with construction of the cable and measurement of the cable diameter. In response to determining the type of cable used, an appropriate American Wire Gauge (AWG) value is determined by inserting the selected cable in one or more of a set of wire gauge measuring intervals integral with a cable bend radius gauge. In response to a determination of a dimension associated with a proper notch, a bend member corresponding to the dimension associated with the proper notch is identified. In response to identifying a bend member corresponding to the dimension associated with the proper notch, the selected cable is bent around the bend member identified in accordance with a minimum cable bend radius of the bend member identified.

DETAILED DESCRIPTION

Figure 1:
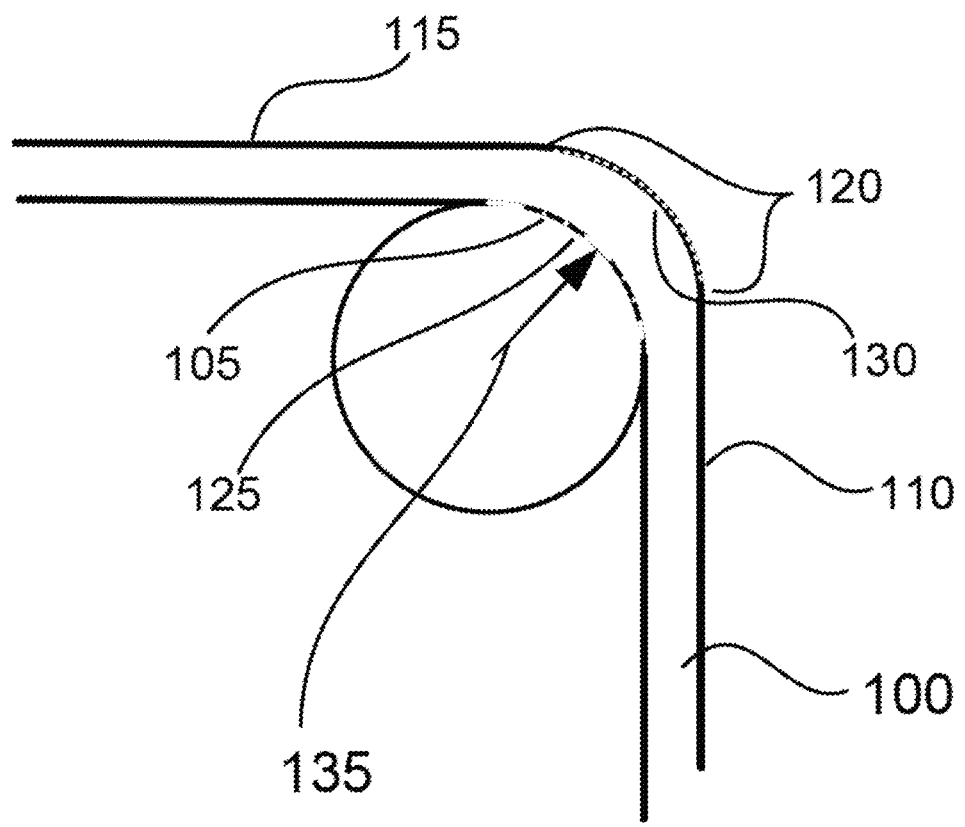
FIG. 1 is a line drawing of a cable bend radius in one embodiment of the present invention.

With reference now to FIG. 1, a schematic view of a cable bend radius in one embodiment of the present invention is presented. In the cabling industry there is typically not a template to measure critical angles caused when routing of cables is performed. Therefore, a template in the form of a cable bend radius gauge is disclosed, which when used, typically prevents excessive bending of cables, beyond a minimum bend radius, during routing operations.

FIG. 1 discloses an apparatus, also referred to as a device or a tool in the form of a template having one or more levels of varying radius values to accommodate cables of differing types and diameters. This disclosed apparatus provides a practical solution for cable routing using predetermined permissible bend radius values associated with corresponding cable selections. Using the cable bend radius gauge as disclosed typically avoids scrap and damage costs associated with damaged cables caused by an incorrect bend radius in a cable as a result of a routing operation.

Given the structure of a round conductor, an outer edge of the conductor defines a curve of a greater arc length than a corresponding inner edge of the conductor. In FIG. 1, the inner edge of the electrical conductor (dashed line) is under greatest compression along an arc length causing a force perpendicular to the axis of the conductor, outward in a direction of the outer diameter. This compression force typically causes a kink on the inner edge. In contrast, the outer edge of the conductor (dotted line) is under a maximum stretching stress, which directs a force towards the inner edge of the conductor which typically causes a crack on the outer edge. This maximum stretching stress opposes the compression forces and resists the kinking that occurs on the inner edge of the conductor.

Conductor 100 in this example is representative of a cable or wire being bent around a smooth arc of 90 degrees. Inner diameter 105 travels a shorter distance than outer diameter 130 along the arc of the bend of conductor 100 and as a result is compressed. Outer diameter 130 travels a longer distance along the arc of the bend of conductor 100 than inner diameter 105 and as a result is extended. The length of conductor 100 between the start of transition of first segment 110 to second segment 115 is defined as arcuate segment 120. The inner side of arcuate segment 120 is under compression stress 125 while a corresponding outer side of arcuate segment 120 is under an extension stress. The angle of minimum bending radius 135 in this example is 90 degrees to balance compression stress 125 against the extension stress.

Figure 2:
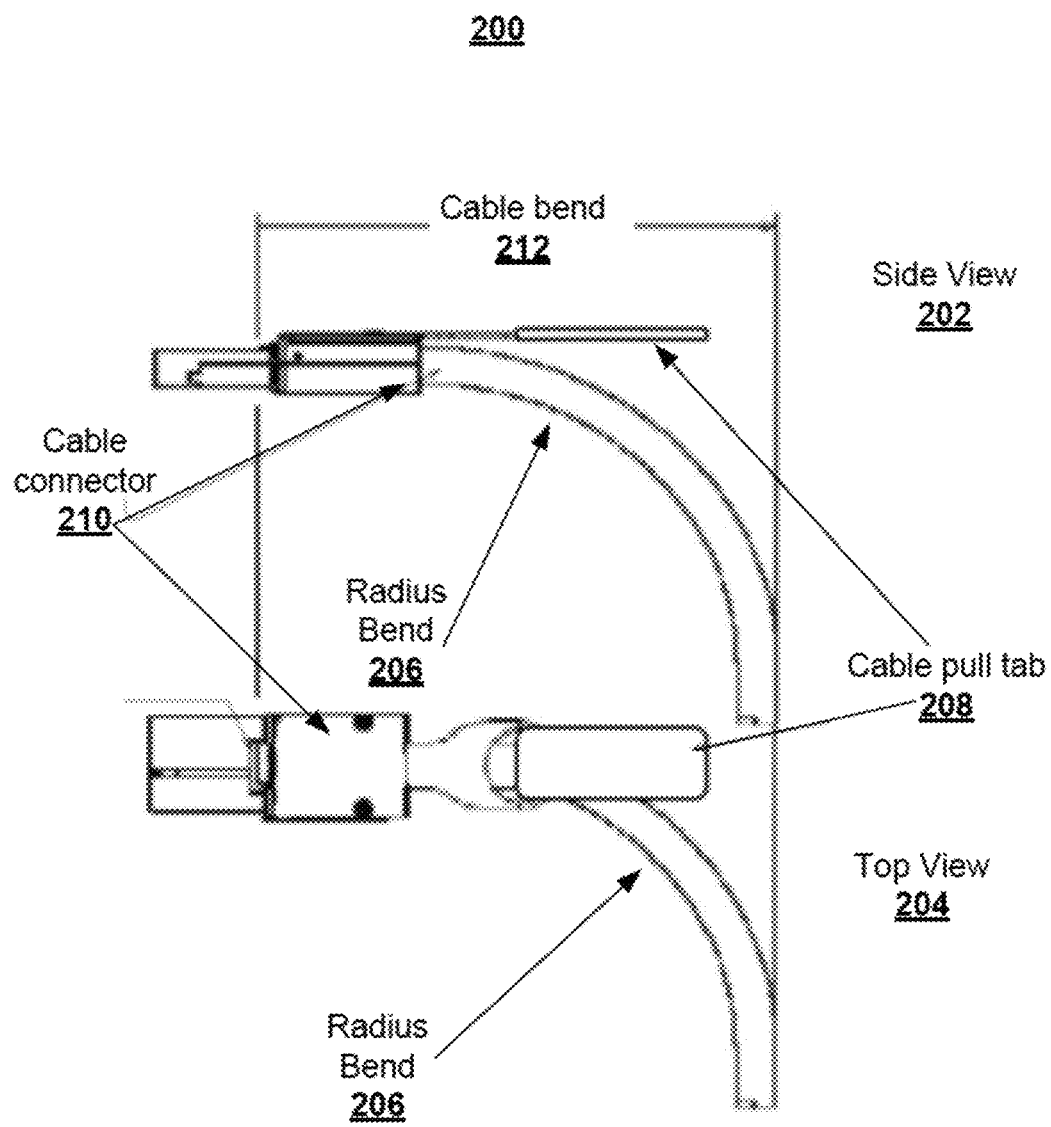
FIG. 2 is a line drawing of a cable bend radius in one embodiment of the present invention.

FIG. 2 illustrates two views of a cable bend radius in one embodiment of the present invention. View 200 includes side view 202 and top view 204 representations of a cable with connector 210 and cable pull tab 208 being bent according to a required specification. Cable bend 212 shows radius bend 206 in side view 202 and top view 204 as being the same in both horizontal and vertical orientations. Radius bend 206 represents a minimum cable bend radius for maintaining physical and conductive integrity of the cable in this example.

Figure 3:
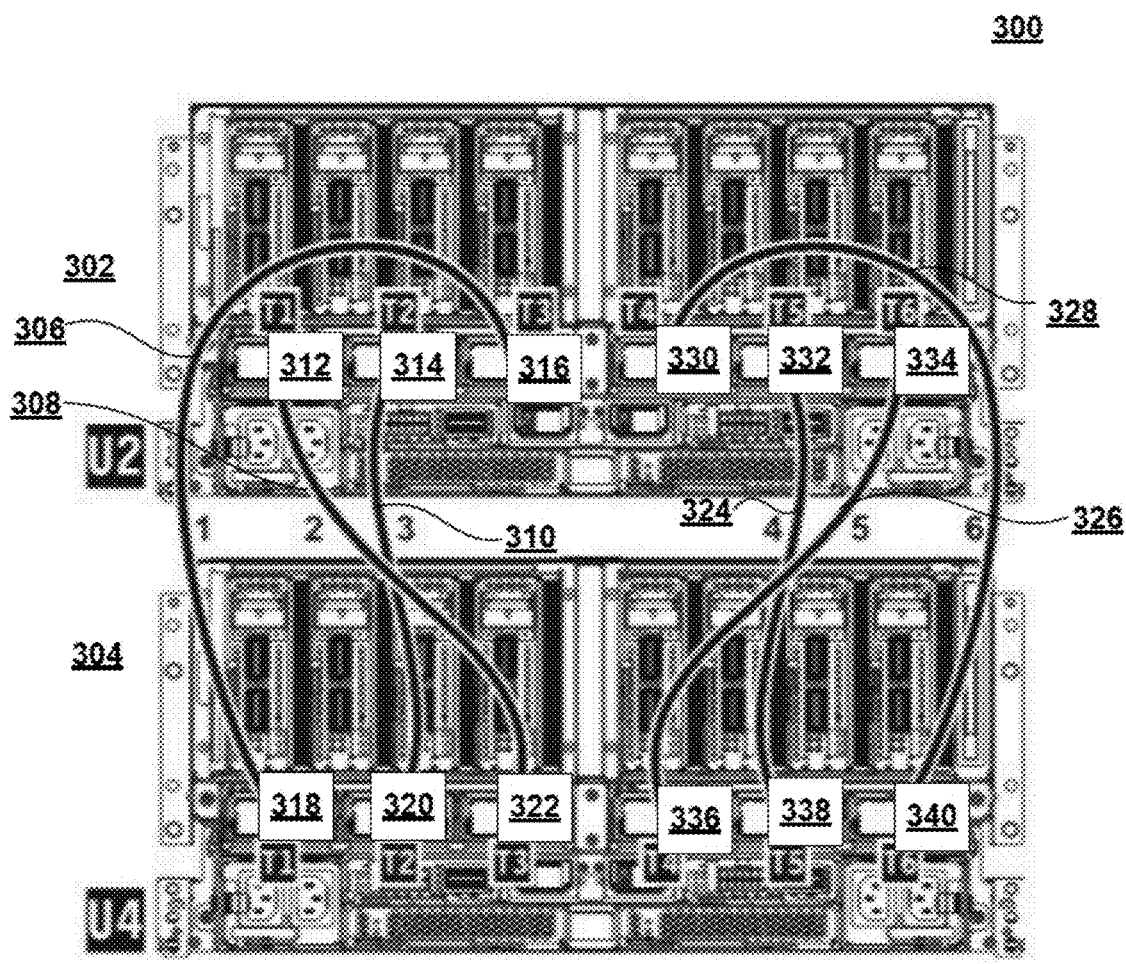
FIG. 3 is a pictorial view of equipment with cables attached using a bend radius gauge in one embodiment of the present invention.

FIG. 3 is a pictorial view of equipment with cables attached as a result of using a bend radius gauge in one embodiment of the present invention. Equipment 300 comprises component 302 (labeled U2) and 304 (labeled U4) in a typical rack mounted configuration. A set of cables 306, 308, 310 (also labeled 1, 2, and 3) provide connection between connectors 312, 314, and 316 (also labeled T1, T2, and T3) of component 302 and connectors 318, 320, and 322 (also labeled T1, T2, and T3) of component 304. In a similar manner a set of cables 324, 326, 328 (labeled 4, 5, and 6) provide connection between connectors 330, 332, and 334 (also labeled T4, T5, and T6) of component 302 and connectors 336, 338, and 340 (also labeled T4, T5, and T6) of component 304.

Cables 306 and 328 also have a graceful bend indicative of a shallow bend radius and corresponding low stress implementation. However, the bend radius of cable 306 adjacent connector 312 and the bend radius of cable 328 adjacent connector 334 have larger bend radius than cables 308, 310, 324, and 326. In all cases the bend radius of the cables of FIG. 3 is greater than a minimum cable bend radius for the selected cables providing a low stress implementation.

Figure 4:
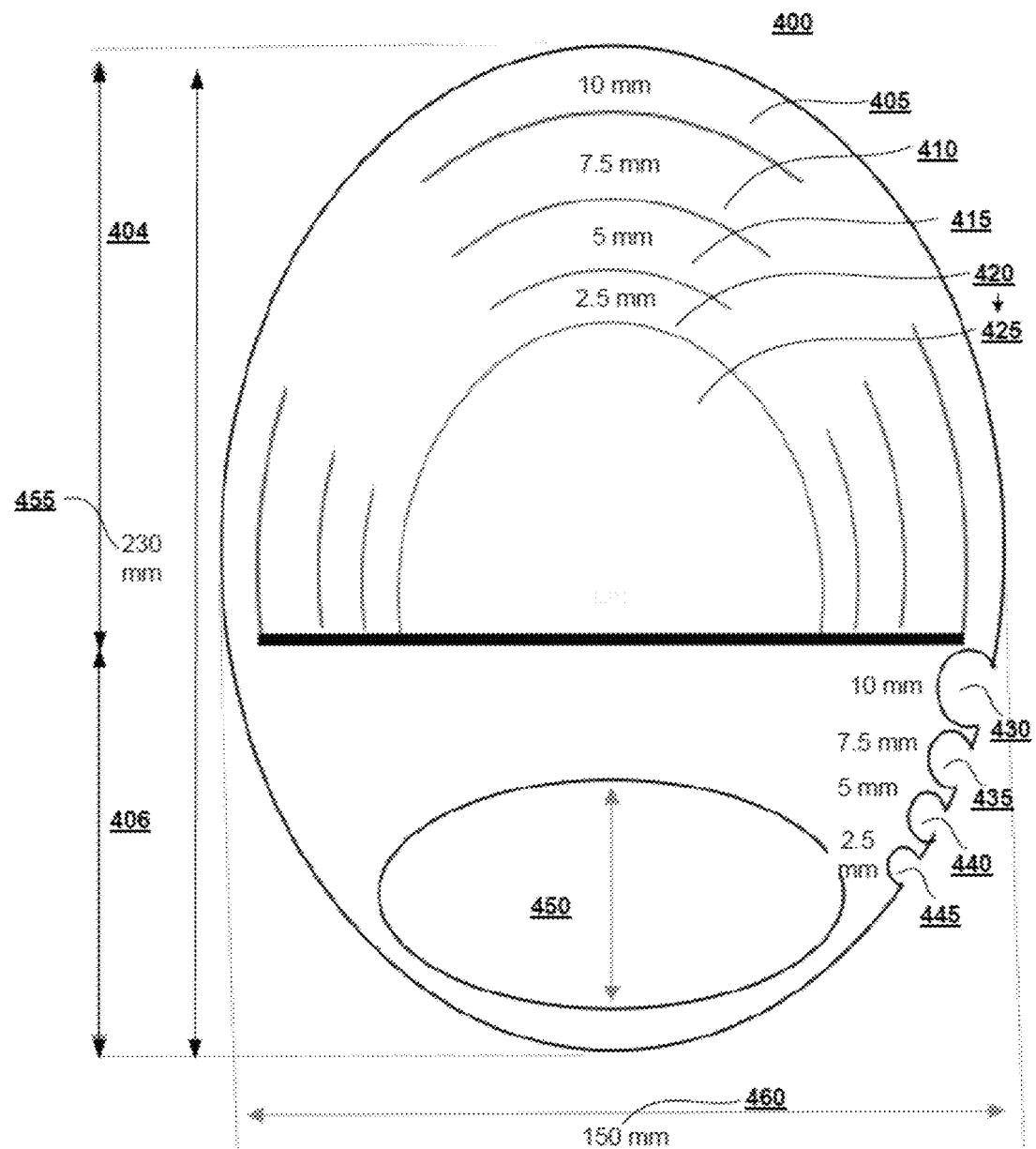
FIG. 4 is a top view of a bend radius gauge in one embodiment of the present invention.

FIG. 4 is a top view of a cable bend radius gauge in one embodiment of the present invention. Cable bend radius gauge 400 comprises a base 405, a number of bend members 410-425, a set of sizing notches 430-445 and a hand hold 450. Cable bend radius gauge 400, in this example, may be constructed of a solid material including wood, plastic or metal. A solid material permits base 405, and bend members 410-425 to be cut from sheets and bonded together as a unit. In this case, when viewed from the top bend members 410-425 would appear as a set of steps rising from base 405. Members of bend members 410-425 in the set of steps would become smaller in area as the distance from base 405 increased. As a result, the set of bend members are arranged in a raised diminishing hierarchy on the upper surface in the first area forming a cable bend radius gauge. The shapes of individual bend members 410-425 differ because the radius bend of each respective bend member is dependent upon a cable type and diameter and is therefore different relative to any other member.

Base 405 comprises bend member portion 404 and hand hold portion 406. Sizing of bend member portion 404 is typically greater than hand hold portion 406. Bend member portion 404 is sized to permit the number of bend members 410-425 to exist in a hierarchy of levels of diminishing surface area. Each of bend members 410-425 is dimensioned to have a unique bend radius which is up to and including a minimum bending radius for a respective cable. Therefore, cable bend radius gauge 400 accommodates multiple different types and diameters of cables with a proper minimum bending radius for each respective cable in a single tool. The top view of FIG. 4 clearly discloses a raised hierarchy of bend members 410-425 adjacent base 405 each accommodating a different cable type and capability. Indicia indicating a value of a wire gauge or cable diameter corresponding to a bend member may be affixed to the bend member to guide an operator is positioning a cable in a correct bend member. Indicia indicating a value of a wire gauge or cable diameter corresponding to a sizing notch may be affixed near a respective sizing notch in set of sizing notches 430-445 to aid an operator in identifying a particular size of cable being used. Indicia indicating a value of the wire gauge corresponding to a bend member in bend members 410-425 may be affixed to a respective bend member to guide an operator is positioning a cable in a curved portion of an associated bend member.

In another embodiment, cable bend radius gauge 400 may be formed as a molded unit comprising base 405, bend members 410-425 which are solid and integral with base 405 in bend member portion 404, set of sizing notches 430-445 in hand hold portion 406 along one edge of base 405 and hand hold 450 as a void or hole in hand hold portion 406 of base 405 forming a segment of base 405 suitable for grasping with the hand of a user. In yet another example of a molded unit, base 405, and number of bend members 410-425 may be integral but not solid. In this case, when viewed from an underside through a portion of base 405 bend members 410-425 would appear as a set of inner steps. In a top view, bend members 410-425 of the set of inner steps would become smaller in area as the distance from base 405 increased.

In another embodiment bend members 410-425 which are solid, may have a hole through each member in alignment with a similar hole in base 405 sized to accommodate a fastener. Suitable releasable fasteners may be formed from hardware including bolt and nut, quarter turn fastener, cam lock, and a post with a mounting hole for a pin with sized spacers to capture the base and members between. This arrangement enables a structure comprising the base 405 and bend members 410-425 to be removably coupled together in a secure manner. When fastened together base 405 and bend members 410-425 form a unit equivalent to a molded embodiment. This structure enables bend members 410-425 to be selectively attached to base 405 according to requirements for bending of cables of different types and diameters. Although in the previous embodiments bend members 410-425 accommodated bending of cables of different types and diameters, a bonded or molded structure in the previous embodiments is of a fixed nature that does not permit selection of individual bend members as may be needed.

In another embodiment hand hold 450 may be a handle or knob affixed to an upper surface of base 405 or a finger hold bar on a lower surface of base 405 or a combination thereof. The embodiment of FIG. 4 illustrates an embodiment of a tool for bending cable. A web forming base 405 has an upper surface, a lower surface, a first edge, a second edge, a first area defining a bend member portion and a second area defining a hand hold portion. The set of sizing notches 430-445 in hand hold portion 406 along the first edge of base 405 is a set of wire gauge measuring intervals integral with the first edge in the second area. A set of bend members, bend members 410-425, is arranged in a raised diminishing hierarchy on the upper surface in the first area with each bend member having an edge defining a predetermined arc forming a channel to receive a particularly dimensioned cable. Each different bend member has a respective edge corresponding to a respective wire gauge forming an instance of a cable bend radius.

Figure 5:
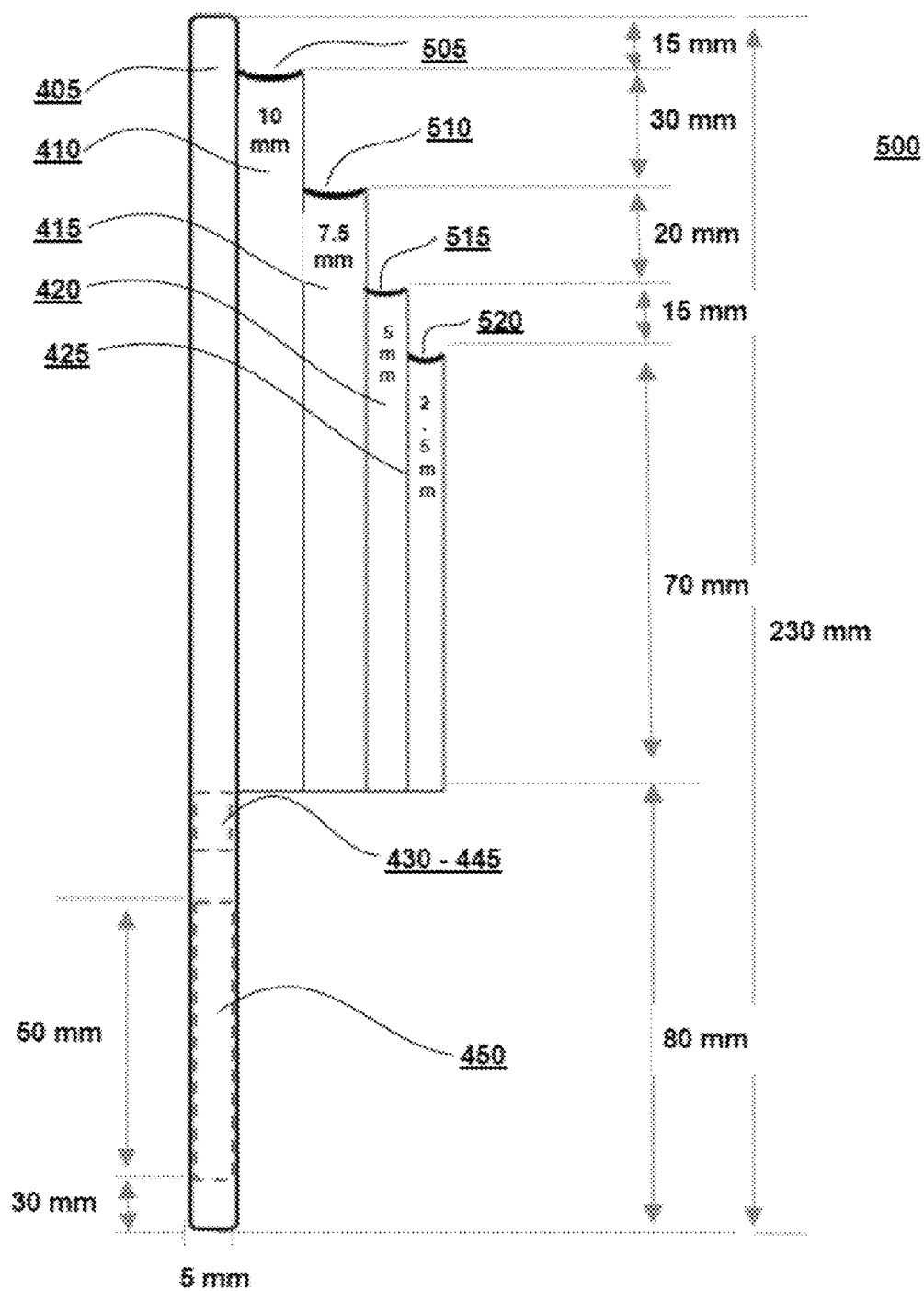
FIG. 5 is a side view of the bend radius gauge of FIG. 4 in one embodiment of the present invention.

FIG. 5 is a line drawing of a side view of cable bend radius gauge 400 of FIG. 4 in one embodiment of the present invention. Side view 500 of FIG. 5 clearly discloses a raised hierarchy of bend members 410-425 adjacent base 405. In this embodiment there are four bend members, each accommodating a different cable type and capability.

The leftmost element of FIG. 5 is base 405 of FIG. 4 including set of sizing notches 430-445 depicted in hidden view and hand hold 450 also in hidden view. Adjacent base 405 is bend member 410 with concave portion 505. Concave portion 505 is dimensioned to receive the curved sidewall of a predetermined cable designated for use with bend member 410. Concave portion 505 traverses the length of an arcuate segment of bend member 410.

In a similar manner adjacent to bend member 410 is bend member 415 with concave portion 510. Concave portion 510 is dimensioned to receive the curved sidewall of a respective predetermined cable designated for use with bend member 415. Concave portion 510 traverses the length of an arcuate segment of bend member 415.

In a similar manner adjacent to bend member 415 is bend member 420 with concave portion 520. Concave portion 515 is dimensioned to receive the curved sidewall of a respective predetermined cable designated for use with bend member 420. Concave portion 515 traverses the length of an arcuate segment of bend member 420.

In a similar manner adjacent to bend member 420 is bend member 425 with concave portion 520. Concave portion 520 is dimensioned to receive the curved sidewall of a respective predetermined cable designated for use with bend member 425. Concave portion 520 traverses the length of an arcuate segment of bend member 425.

Dimensions on FIG. 5 are representative of an example of a cable bend radius gauge in one embodiment of the present invention. In one aspect the dimensions provide a relative sizing of the components in a practical example of a tool for bending various cable sizes according to prescribed respective radius measurements. The dimensions also provide a quick reference for a worker having sized a cable using set of sizing notches 430-445 to easily correlate a corresponding bend member with a respective label associated with a respective dimension.

Figure 6:
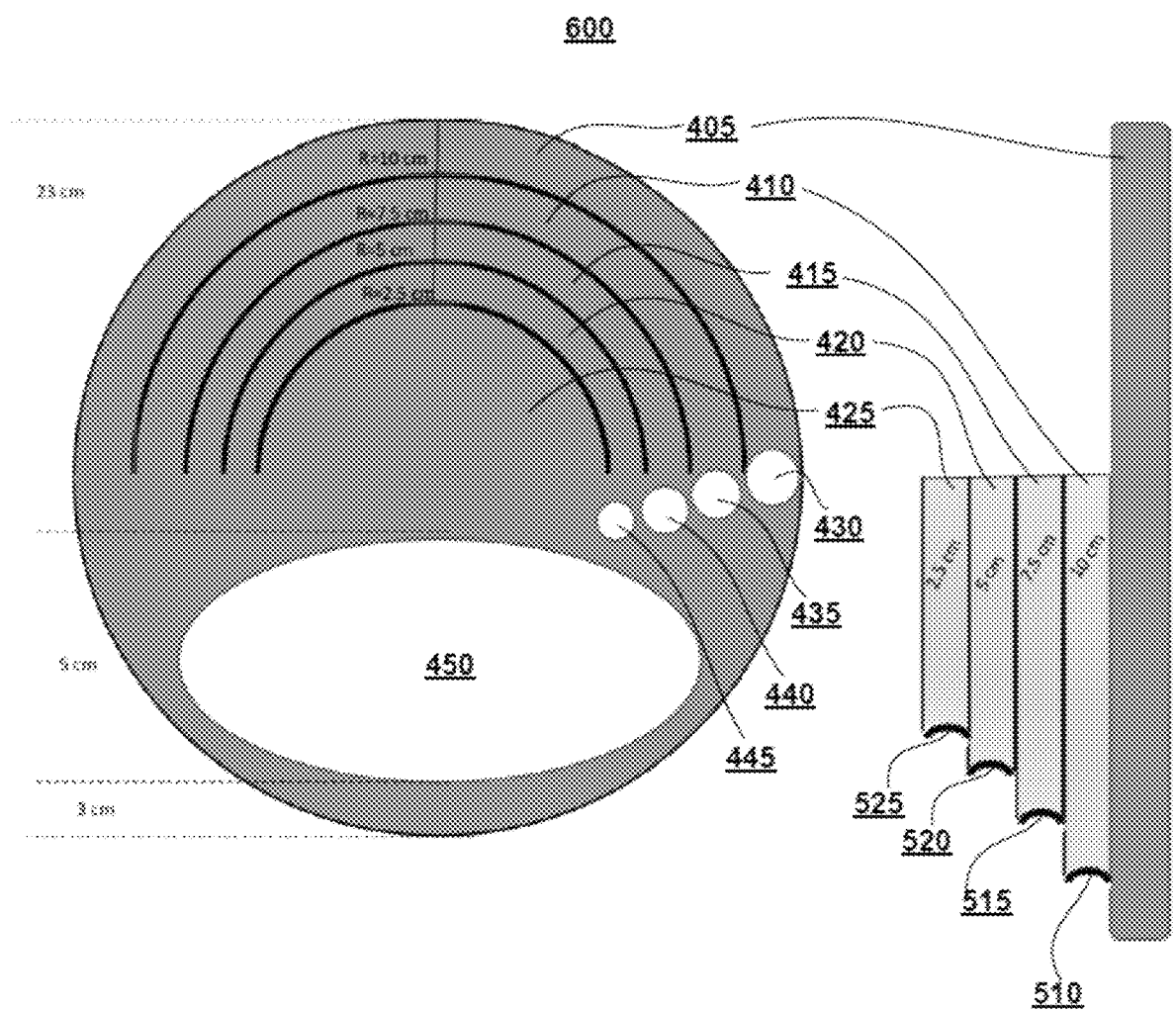
FIG. 6 is a top view with inverted side view of a bend radius gauge in one embodiment of the present invention.

FIG. 6 is a side view of cable bend radius gauge 400 of FIG. 4 in one embodiment of the present invention. The side view of FIG. 6 clearly discloses the raised hierarchy of bend members 410-425 adjacent base 405 as in FIG. 4. In this embodiment, as in FIG. 4, there are four bend members, 410-425 each accommodating a different cable type and capability. Each of bend members 410-425 and base 405 is represented in a corresponding side view. Hand hold 450 is also present within base 405 as before. In this example, the side view of cable bend radius gauge is inverted in comparison to that of FIG. 4. Dimensions in centimeters are presented to provide the reader with a realistic relative sizing and placement of the components.

Each of the bend members 410-425 in the inverted position has a concave portion depicted in concave portions 510-525. Each of these concave portions is dimensioned to receive a curved sidewall of a respective predetermined cable designated for use with the particular bend member.

The set of sizing notches 430-445 in hand hold portion 406 along the first edge of base 405 of FIG. 5 is now depicted as set of sizing holes 430-445. It may be noted set of sizing notches 430-445 will work with cables having connectors applied and cables without connectors. The set of sizing holes 430-445 of FIG. 6 is useful only with cables without connectors because the connectors cannot fit through a hole.

Figure 7:
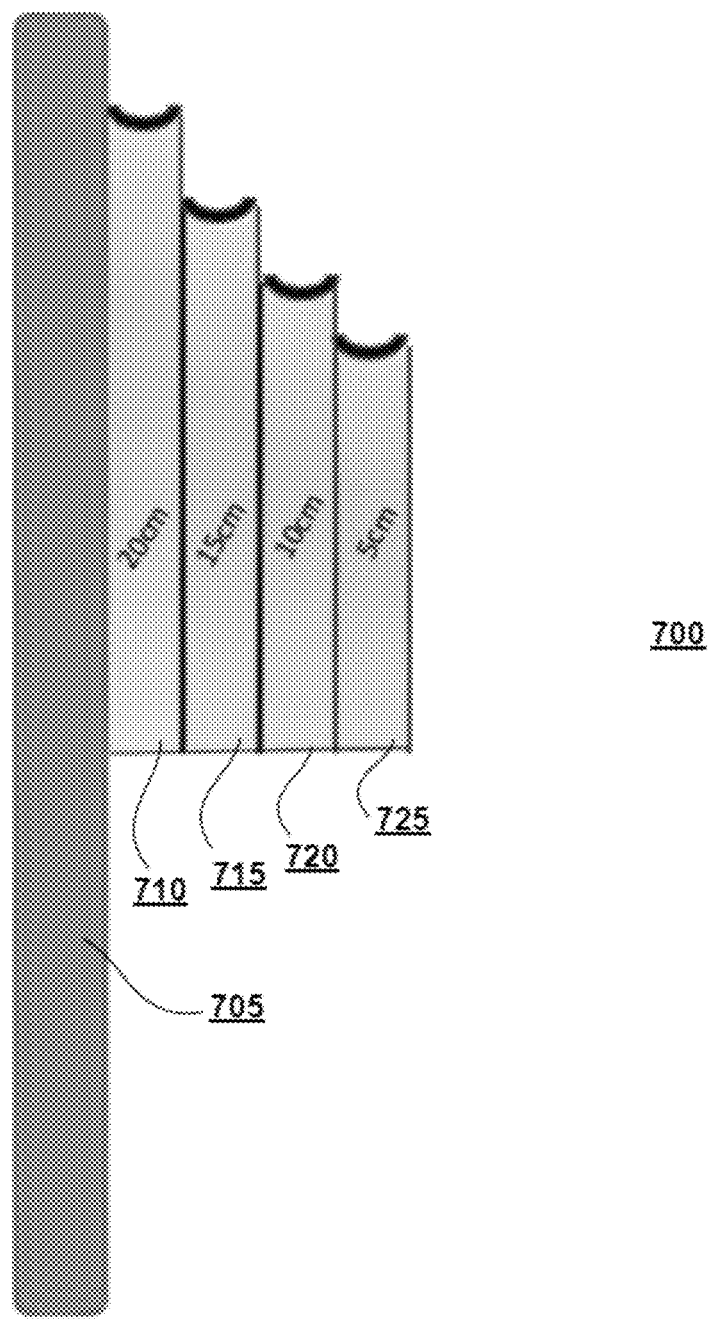
FIG. 7 is a side view of a bend radius gauge of FIG. 6 in one embodiment of the present invention.

FIG. 7 is a side view of cable bend radius gauge 600 of FIG. 6 in one embodiment of the present invention. The side view of FIG. 7 clearly discloses the raised hierarchy of bend members 410-425 adjacent base 405 as in FIG. 5. In this embodiment and as in FIG. 6 there are four bend members, 710-725 each accommodating a different cable type and capability. Each of bend members 710-725 and base 705 is represented. In this example, bend members 710-725 have corresponding dimensions of 20 centimeters, 15 centimeters, 10 centimeters, and 5 centimeters respectively. Dimensions in centimeters are presented to provide the reader with a realistic relative sizing of the components. In these example embodiments only four bend members are shown however, one skilled in the art would reasonably conclude more or fewer numbers of bend members may be constructed without departing from the disclosed embodiments.

Figure 8:
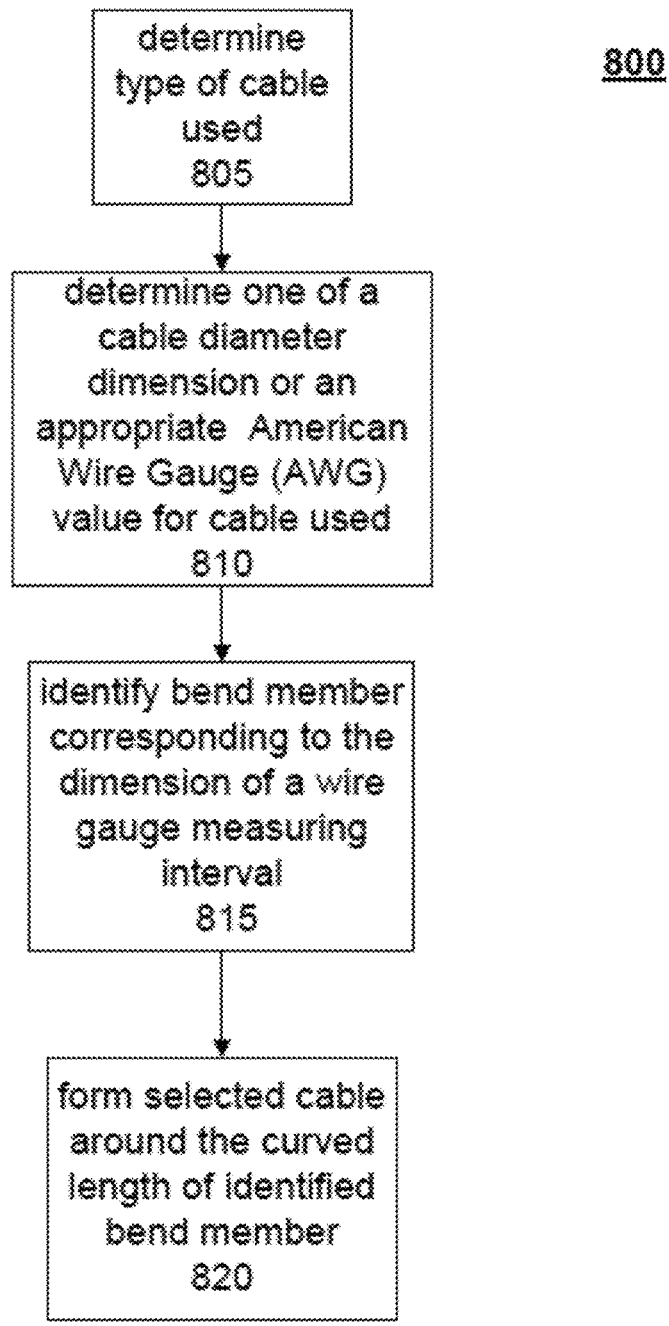
FIG. 8 is a process of using a bend radius gauge of FIG. 4 in one embodiment of the present invention.

FIG. 8 is a flow diagram of a process using cable bend radius gauge 400 of FIG. 4. Process 800 used in operation of cable bend radius gauge 400 of FIG. 4 involves determining a type of cable used (step 805). Determination of the type of cable typically provides descriptive information including cable construction (single conductor, multiple conductor and shielded or no shielded variants) and measurement of the cable diameter.

In response to determining the type of cable including the descriptive information a determination is made of one of a cable diameter dimension or an appropriate American Wire Gauge (AWG) value for cable used (step 810). This determination is achieved by inserting a selected cable in one or more of the set of wire gauge measuring intervals integral with the first edge of the cable bend radius gauge. In one example, a cable without attached connector may be inserted through one of several holes of the set of wire gauge measuring intervals. In another example one or more of the notches of the set of wire gauge measuring intervals is used. When using the notches of the set of wire gauge measuring intervals to identify a correct sizing, the selected cable should slide into a particular notch with a friction fit. This friction fit provides a predetermined tolerance of space between the interior wall of the notch and exterior of the cable. A friction fit also applies to the several holes, enabling a user to determine which of the several holes provides an appropriate fit for a respective cable diameter. In either case using the set of notches or the several holes the process is similar.

In response to a determination of a dimension associated with the wire gauge measuring interval, as in the proper notch, or hole as the case may be, a bend member corresponding to the dimension of a wire gauge measuring interval is identified (step 815). The selected cable is then formed around the curved length of the identified bend member corresponding to the determined dimension (step 820). The bend member corresponding to the identified dimension is constructed with a minimum bend radius associated with the previously determined cable. One skilled in the art would reasonably conclude a user may skip steps associated with identifying a cable type, diameter and selection of a notch when the cable type, diameter and value associated with an appropriate notch is known, for example due to being previously used or otherwise directly indicated. Bending of the cable can proceed directly using a bend member indicated by a corresponding one or more of the set of wire gauge measuring intervals exemplified as an "identified notch" or "hole" as the case indicates.

Typical advantages for this tool include being easy to implement in the manufacturing industry with low cost. In addition, without requiring necessarily technically skilled workers the tool can be used with a variety of cable types, easily managing differing cable types, and requires no additional source of energy in use. Embodiments of the disclosed invention represent an effective hand tool.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A tool for bending cable, comprising:
   a web forming a base having an upper surface, a lower surface, first edge, second edge, a first area of the base defining a bend member portion and a second area of the base defining a hand hold portion;
   a set of wire gauge measuring intervals integral with the first edge in the second area;
   a set of bend members arranged in a raised diminishing hierarchy on the upper surface in the first area forming a cable bend radius gauge; and
   a void in the second area forming the hand hold portion dimensioned to permit portions of a hand of a user to slip through the upper surface and the lower surface enabling the user to grasp the base.

2. The tool of claim 1, further comprising:
   the set of bend members bonded to each other and to the base to form a structure of the cable bend radius gauge.

3. The tool of claim 1, further comprising:
   the set of bend members each having a hole through in alignment with a corresponding hole positioned through the base; and
   a fastener positioned through each of the set of bend members and the base to releasably attach the set of bend members to the base in a selective arrangement to form a configurable structure of the cable bend radius gauge.

4. The tool of claim 1, further comprising:
   a first set of indicia, each indicia affixed adjacent to a respective one of the set of wire gauge measuring intervals; and
   a second set of indicia, each indicia affixed adjacent to a respective one of the set of bend members and corresponding to a respective indicia affixed to a corresponding one of the set of wire gauge measuring intervals.

5. The tool of claim 1, wherein each of the set of wire gauge measuring intervals corresponds to a respective one of the set of bend members.

6. The tool of claim 1, wherein a predetermined arc forming a channel to receive a particularly dimensioned cable is a minimum cable bend radius associated with a particular cable type and diameter.

7. The tool of claim 1, wherein the set of wire gauge measuring intervals integral with the first edge in the second area is set of notches in which each notch is dimensioned to accommodate a respective cable dimension.

8. The tool of claim 7, wherein the set of notches in which each notch is dimensioned to accommodate the respective cable dimension further includes being dimensioned to accommodate a cable with a connector and having the respective cable dimension.

9. The tool of claim 1, wherein the set of wire gauge measuring intervals integral with the first edge in the second area is a set of holes in which each hole is dimensioned to accommodate a particular cable having a respective cable dimension and absent a connector.

10. The tool of claim 1, further comprising each bend member having an edge defining a predetermined arc forming a channel to receive a particularly dimensioned cable, each different bend member having a respective edge corresponding to a respective wire gauge to form the cable bend radius gauge.

11. A tool for bending cable, comprising:
    a web forming a base having an upper surface, a lower surface, first edge, second edge, a first area of the base defining a bend member portion and a second area of the base defining a hand hold portion;
    a set of wire gauge measuring intervals integral with the first edge in the second area;
    a set of bend members forming a cable bend radius gauge arranged in a raised diminishing hierarchy adjacent the upper surface in the first area, each bend member comprising:
        a concave portion dimensioned to receive a curved sidewall of a predetermined cable corresponding to a respective wire gauge from the set of wire gauges; and
    a void in the second area forming the hand hold portion dimensioned to permit portions of a hand of a user to slip through the upper surface and the lower surface of the base enabling the user to grasp the base.

12. The tool of claim 11, further comprising:
    each of the set of bend members bonded to one other bend member using associated spaced apart concave portions; and
    one of the set of bend members bonded to the base using the associated spaced apart concave portions to form a structure of the cable bend radius gauge.

13. The tool of claim 11, further comprising:
    the set of bend members each having a hole through in alignment with a corresponding hole positioned through the base; and
    a fastener positioned through each of the set of bend members and the base to releasably attach the set of bend members to the base in a selective arrangement to form a configurable structure of the cable bend radius gauge.

14. The tool of claim 11, further comprising:
    a first set of indicia, each indicia affixed adjacent to a respective one of the set of wire gauge measuring intervals; and
    a second set of indicia, each indicia affixed adjacent to a respective one of the set of bend members and corresponding to a respective indicia affixed to a corresponding one of the set of wire gauge measuring intervals.

15. The tool of claim 11, wherein each of the set of wire gauge measuring intervals corresponds to a respective one of the set of bend members, and wherein the predetermined arc forming a channel to receive the particularly dimensioned cable is a minimum cable bend radius associated with a particular cable type and diameter, and wherein the set of wire gauge measuring intervals integral with the first edge in the second area is set of notches in which each notch is dimensioned to accommodate a respective cable dimension.

16. The tool of claim 15, wherein the set of notches in which each notch is dimensioned to accommodate a respective cable dimension further includes being dimensioned to accommodate a cable with a connector and having a respective cable dimension.

17. The tool of claim 11, wherein the set of wire gauge measuring intervals integral with the first edge in the second area is set of holes in which each hole is dimensioned to accommodate a particular cable having a respective cable dimension and absent a connector.

\* \* \* \* \*